US007647424B2

(12) United States Patent
Kim et al.

(10) Patent No.: US 7,647,424 B2
(45) Date of Patent: Jan. 12, 2010

(54) MULTI-LEVEL REDIRECTION SYSTEM (75) Inventors: Jooyong Kim, Des Plaines, IL (US); Sukwon Yi, Gyeonggi-Do (KR); Jason Michael Abate, Chicago, IL (US)

(73) Assignee: Hostway Corporation, Chicago, IL (US)

( * ) Notice: Subject to any disclaimer, the term of this patent is extended or adjusted under 35 U.S.C. 154(b) by 687 days.

(21) Appl. No.: 11/340,167

(22) Filed: Jan. 26, 2006

(65) Prior Publication Data
US 2006/0288119 A1 Dec. 21, 2006

Related U.S. Application Data (60) Provisional application No. 60/690,860, filed on Jun. 15, 2005.

(51) Int. Cl.
*G06F 15/173* (2006.01)
(52) U.S. Cl. .................. 709/238; 709/239; 709/240
(58) Field of Classification Search ........... 709/238, 709/239, 223, 230
See application file for complete search history.

(56) References Cited

U.S. PATENT DOCUMENTS

| | | | |
|---|---|---|---|
| 5,774,668 A | 6/1998 | Choquier et al. | |
| 5,951,694 A | 9/1999 | Choquier et al. | |
| 5,956,716 A | 9/1999 | Kenner et al. | |
| 6,003,030 A | 12/1999 | Kenner et al. | |
| 6,070,191 A | 5/2000 | Narendran et al. | |
| 6,108,703 A | 8/2000 | Leighton et al. | |
| 6,112,239 A | 8/2000 | Kenner et al. | |
| 6,167,441 A | 12/2000 | Himmel | |
| 6,185,598 B1 | 2/2001 | Farber et al. | |
| 6,286,045 B1 | 9/2001 | Griffiths et al. | |
| 6,760,775 B1 * | 7/2004 | Anerousis et al. | 709/238 |
| 6,799,214 B1 | 9/2004 | Li | |
| 6,874,015 B2 | 3/2005 | Kaminsky et al. | |
| 6,996,616 B1 | 2/2006 | Leighton et al. | |
| 7,010,578 B1 | 3/2006 | Lewin et al. | |
| 7,254,617 B2 * | 8/2007 | Schuh et al. | 709/214 |
| 7,284,055 B1 * | 10/2007 | Oehrke et al. | 709/226 |
| 2002/0161835 A1 | 10/2002 | Ball et al. | |

(Continued)

FOREIGN PATENT DOCUMENTS

WO      WO 02/17082 A1      2/2002

OTHER PUBLICATIONS

A Framework for Minimizing Latency in CND Using URL Request Routing Approach.

(Continued)

*Primary Examiner*—Wing F Chan
*Assistant Examiner*—Razu A Miah
(74) *Attorney, Agent, or Firm*—Brinks Hofer Gilson & Lione (57) ABSTRACT In a multi-level redirection method, a first level redirection of a first request is performed based on static information. At a manager, a second level redirection of a second request is performed to an agent server based on dynamic information. The manager is configured to monitor an individual status of the agent server. The static information is associated with selection of the manager and the dynamic information is associated with selection of the agent server. The second level redirection is application redirection performed based on application protocols and contents used in the first and second request.

22 Claims, 9 Drawing Sheets

U.S. PATENT DOCUMENTS

| | | | |
|---|---|---|---|
| 2003/0149581 A1 | 8/2003 | Chaudhri et al. | |
| 2003/0185197 A1* | 10/2003 | Banerjee et al. | 370/351 |
| 2004/0205162 A1 | 10/2004 | Parikh | |
| 2006/0020684 A1 | 1/2006 | Mukherjee et al. | |
| 2006/0021661 A1* | 2/2006 | Koch et al. | 137/543.19 |
| 2006/0195660 A1* | 8/2006 | Sundarrajan et al. | 711/118 |
| 2006/0218304 A1 | 9/2006 | Mukherjee et al. | |
| 2007/0055765 A1 | 3/2007 | Lisiecki et al. | |

OTHER PUBLICATIONS

P. Gayek, et al., IBM Systems Journal, vol. 43, No. 1, 2004 A Web Content Serving Utility, pp. 43-63.

Leeann Bent, et al., "Whole Page Performance", Aug. 14, 2002 (38 pages).

Leeann Bent, et al., "Whole Page Performance" available at http://historical.ncstrl.org/tr/fulltext/tr/ucsd_cs/CS2002-0729.txt, Jul. 29, 2002 (29 pages).

* cited by examiner

MULTI-LEVEL REDIRECTION SYSTEM

CROSS REFERENCE TO RELATED APPLICATIONS

This application claims the benefit or priority of U.S. Provisional Application No. 60/690,860, filed Jun. 15, 2005. The disclosure of the above application is incorporated herein by reference.

BACKGROUND

1. Technical Field

The invention relates to an internet data delivery system and more particularly, to a multi-level redirection system for use with an internet.

2. Related Art

A content delivery network (CDN) is a mechanism that delivers some or all content from cache servers distributed at multiple locations. CDNs include origin servers and cache servers. Some or all of the contents of web responses may be served with the cache servers and therefore, the origin servers may significantly reduce work load. Further, fast response may be provided to users. The cache servers may be distributed at multiple locations around the network. Some or all of the contents of the origin servers are cached or mirrored at the cache servers. When a web request comes in, CDNs try to locate an appropriate cache server to serve the request. For example, the appropriate cache server may be close to a user geographically, or in terms of a network distance between the cache server and a user's machine.

One of known CDN techniques is a domain name system (DNS) redirection, which is described in U.S. Pat. No. 6,108,703 to Leighton et al. In U.S. Pat. No. 6,108,703, embedded objects are served from one of multiple cache servers. To locate an appropriate cache server, DNS servers determine a user's location in the network and provide a user with an IP address mapped to a cache server adjacent the user's location. A user requests the embedded objects to the cache server and receives the desired response from the cache server.

Although other redirection techniques may be available, conventional CDNs operate at one level by redirecting some or all contents for a request from origin servers to cache servers.

BRIEF SUMMARY

By way of introduction only, a multi-level redirection method is provided. In one embodiment, a first level redirection of a first request is performed to a manager based on static information. At the manager, a second level redirection of a second request is performed to an agent server based on dynamic information. The manager monitors an individual status of the agent server. The static information is associated with selection of the manager and the dynamic information is associated with selection of the agent server. The second level redirection is application redirection performed based on application protocols and contents used in a request from a client.

In other embodiment, a multi-level redirection system includes a plurality of managers and a plurality of cache servers. The managers receive a first request redirected with a first level redirection and perform a second level redirection of a second request. The cache servers supply a response corresponding to the second request. Each manager is associated with a group of the cache servers for monitoring and selecting the cache servers. The first level redirection is associated with global information and the second level redirection is associated with local information. The second level redirection is application redirection performed based on application protocols and contents used in the service request.

In another embodiment, a multi-level redirection system includes means for performing a first level redirection of a first request, means for performing a second level redirection of a second request, and means for performing a third level redirection of the second request. The means for performing the first level redirection performs redirection of a user's request based on static information. The means for performing the second level redirection performs redirection of the second request based on dynamic information. The means for performing the third level redirection performs redirection of the second request based on location of an object requested by the second request. The second level redirection and the third level redirection may be application redirection performed based on application protocols and contents used in the user's request. Alternatively, or additionally, the multi-level redirection system further includes means for performing N level redirection that performs redirection of the second request upon determination that no content requested by the second request is found as a result of the third level redirection. N is a natural number greater than 3.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

First Embodiment

Web Applications

Figure 1:
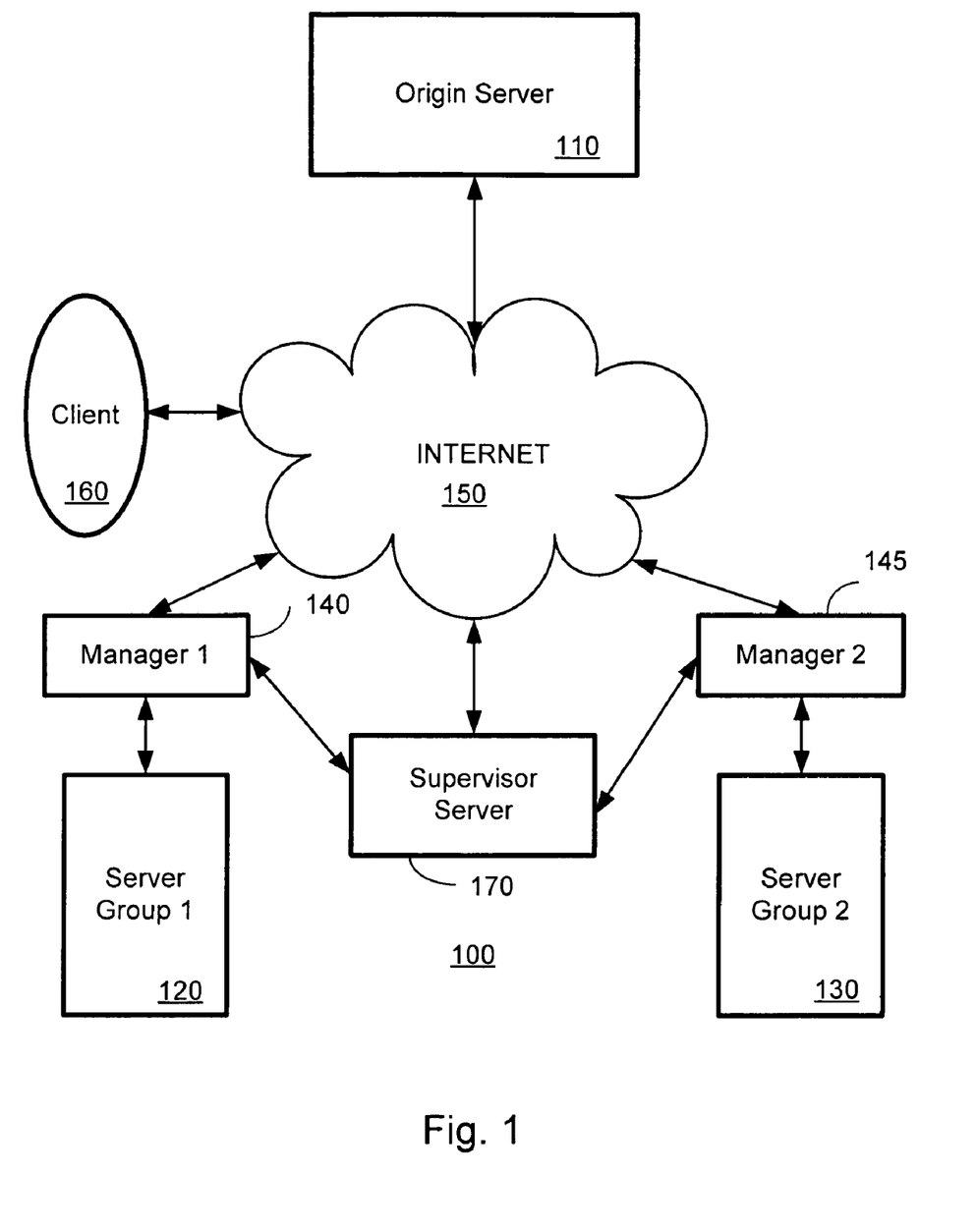
FIG. 1 is a block diagram illustrating one embodiment of a multi-level redirection system.

FIG. 1 illustrates one embodiment of a multi-level redirection system 100 for use in web applications. The multi-level redirection system 100 includes an origin server 110 and a plurality of cache servers, managers 140, 145 and a supervisor server 170. Two representative cache server groups 1 and 2 120 and 130 are illustrated in FIG. 1 and other cache server groups are omitted. Each server group 120 or 130 includes the plurality of cache servers. The server groups 120 and 130 may be located at data centers of hosting service providers and connected by suitable high-speed data networks. Alternatively, the server groups 120 and 130 may be located at internet service providers' business place, or at any other suitable physical location. The server groups 120 and 130 may be located to cover separate geographic areas. For instance, the origin server 110 is located in the U.S. and the server groups 120 and 130 may be located in China. The plurality of servers contained in the server groups 120 and 130 may be connected with network topology suitable for the best routing of a user's request. The common network topology may be applied in each data center and the network topology may not change frequently once established.

In the multi-level redirection system 100, a client 160 may request data or information to the origin server 110 via the internet 150. To obtain data or information, a set of requests are sent from the client 160 to the origin server 110, a domain name system ("DNS") server, or other servers. A request may include a web request or a DNS request. A web request is to request an object represented with a Uniform Resource Locator ("URL"). A DNS request is to request an IP address of a domain. For instance, the client 160 desires to receive video streaming services from the origin server 110. The client 160, the origin server 110, or other servers such as a DNS server may send and receive a set of requests until the client 160 eventually receives desired video. A set of requests may be needed to login a predetermined website, obtain an IP address, etc. The requested content may be located in the origin server 110, or cache servers at the server groups 120 and 130. The origin server 110 or one of cache servers provides certain content to the client 160. Additionally, the managers 140 and 145 may provide the content to the client 160. The origin server 110, the supervisor server 170, or the DNS server may engage in selection of one of the managers 140 and 145 and cache servers.

The first and second server groups 120 and 130 are associated with managers 140 and 145, respectively. The managers 140 and 145 may monitor the server groups 120 and 130 and check the status of the plurality of cache servers in the server groups 120 and 130. The managers 140 and 145 may communicate with the origin server 110 to obtain some contents. The managers 140 and 145 also may communicate with each other. The manager 145 may not communicate with the server group 120 and likewise, the manager 140 may not communicate with the server group 130. The managers 140 and 145 may be implemented with software or hardware. In one embodiment, the managers 140 and 145 may be implemented with a dedicated application residing in one of the plurality of servers. Alternatively, the managers 140 and 145 may be implemented with one of cache servers. The managers 140 and 145 may be collocated with the server groups 120 and 130, or may be separated from the server groups 120 and 130.

In the multi-level redirection system 100, some or all of the contents may be provided in response to a user's request from the managers 140 and 145 and the server groups 120 and 130. The origin server 110 may delegate content delivery at the manager level and a cache server level to a server that belongs to the server group 120 or 130. Accordingly, content delivery may occur at a multi-level rather than at one level because it is redirected to the manager 140 or 145 and from the manager 140 or 145 to a cache server. The multi-level redirection may be associated with a particular type of content. In one embodiment, a base page is redirected at the manager level and embedded objects may be redirected at the cache server level. In other embodiment, embedded objects may be redirected twice. The multi-level redirection also may be performed for various types of a request. In one embodiment, a user may desire to request a web document or a web object. In other embodiment, a P2P application may ask location of an object or a peer. Alternatively, a user may request special functionality such as borrowing processing capacity of cache servers. These embodiments of the multi-level redirection will be further described in conjunction with FIGS. 2-10.

The multi-level redirection may include two levels, three levels, or any other level based upon need and practical considerations of the application. For instance, the cache server may not have the requested content. In that case, the manager 140 redirects the request for the content to the manager 145, or the cache server sends a proxy request to the origin server 110. Accordingly, several levels of redirection may occur until a cache server having the requested content is identified. For this purpose, the managers 140 and 145 may communicate with each other. Alternatively, or additionally, the supervisor server 170 may be used to monitor the managers 140 and 145, as shown in FIG. 1. The supervisor server 170 is a different server from the origin server 110 such that hosting service providers may manage the supervisor server 170.

Figure 2:
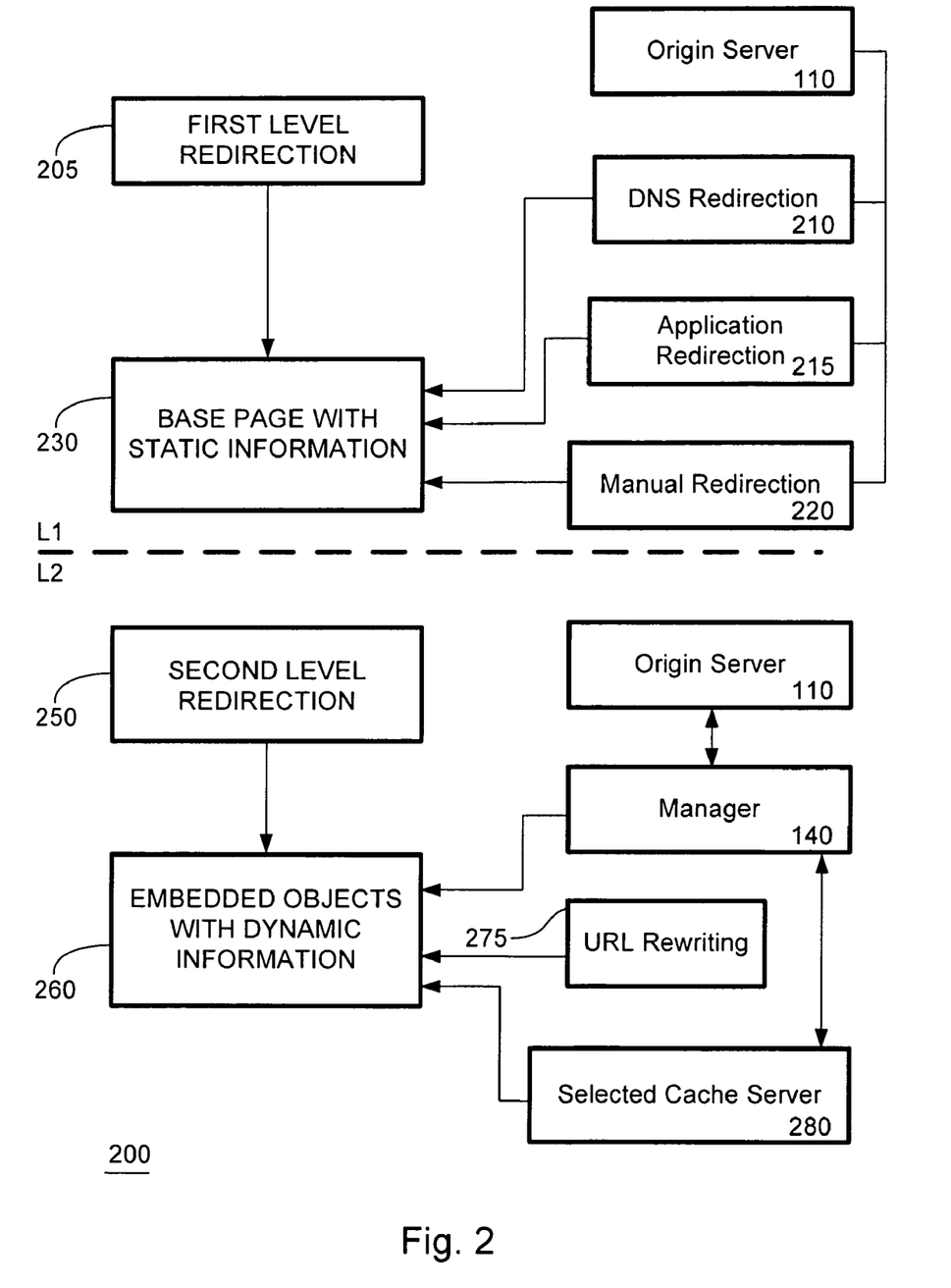
FIG. 2 illustrates the multi-level redirection system of FIG. 1.

FIG. 2 is a block diagram illustrating one example of a multi-level redirection. In this embodiment, two-level redirections L1 and L2 are performed. The two-level redirections L1 and L2 may be associated with a specific type of content. The two-level redirections L1 and L2 may be further associated with a specific type of information used for redirection. As shown in FIG. 2, the first level redirection 205 (L1) is associated with a base page and static information. The second level redirection 250 (L2) is associated with embedded objects and dynamic information. Table 1 summarizes the multi-level redirection associated with specific contents and information.

TABLE 1

Two-level Redirections

| | | |
|---|---|---|
| First level redirection (L1) | Base Page | Static Information Global Information |
| Second level redirection (L2) | Embedded Objects | Dynamic Information Local Information Application Information |

Associated with a Particular Type Of Information

When a request from a user is a web request, the origin server 110 may respond with a web page having a base page and embedded objects. A base page may be a static page such as html files. Alternatively, a base page is dynamically generated and may be represented to have extensions such as cgi, asp, php, etc., as is appreciated by those ordinarily skilled in the art. When a user receives a base page in response to a web request, a user parses that base page and identifies URLs of embedded objects. Then, the user sends a request for embedded objects. Embedded objects may include images, audio, video, links, etc. Embedded objects may be large in size and are often cached at the cache server groups 120 and 130. A base page may or may not be a target for caching.

As noted above, the first level redirection L1 is associated with the static information, whereas the second level redirection L2 is associated with the dynamic information. The static information may not be time-variant and stable once it is established. For instance, network topology and network distance between an U.S. origin server and a data center in Korea may be static and global. Global information may be relevant to geographically distanced servers rather than locally grouped servers. Legal restriction involving a particular type of content service and hosting cost may be another example of static and global information. The static information may be directed to a group of servers rather than an individual server. For instance, the network distance to a data center in Korea may be identical to a group of servers in the same data center. To the contrary, the dynamic information may be constantly time-varying and specific to an individual server. The dynamic information may be relevant to locally grouped servers. For instance, in the same data center, the plurality of cache servers may experience dynamic change in central processing unit ("CPU") load, memory usage, hard disk drive usage, communication bandwidth, etc. Some cache servers may provide different levels of quality of service ("QoS").

Figure 3:
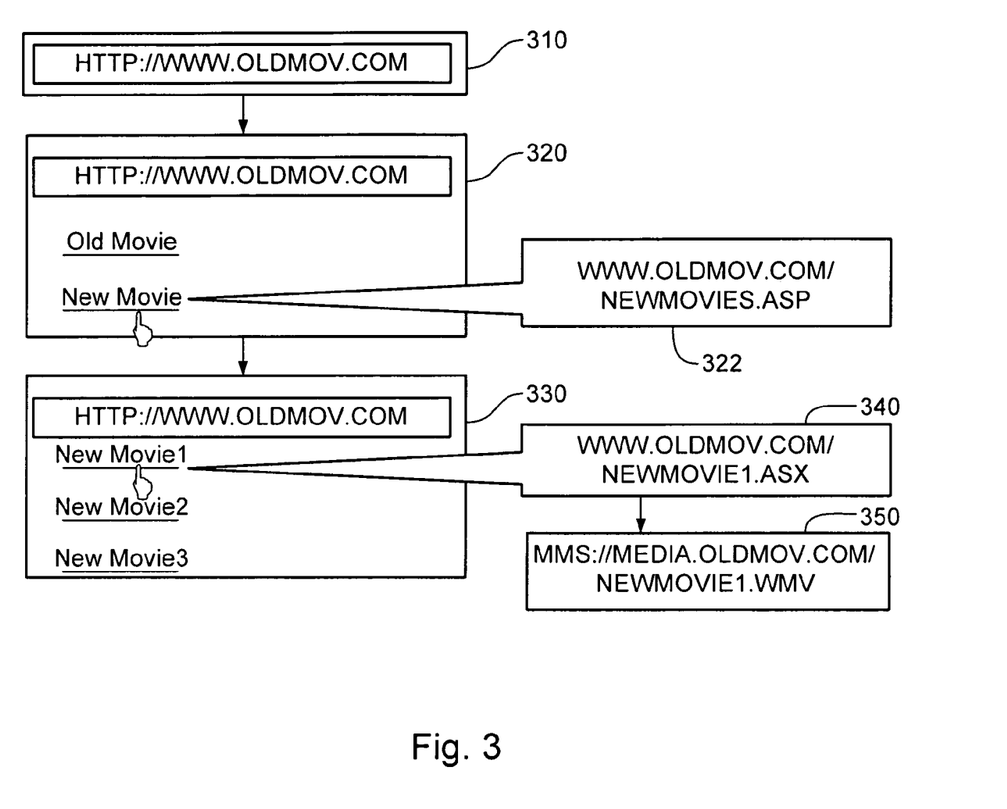
FIG. 3 illustrates one embodiment of a first level redirection.

Referring to FIGS. 1 and 2, the first level redirection 205 (L1) is described. A plurality of requests is sent from a user to the origin server 110, a DNS server, or other servers. Some web requests are not redirected and processed by the origin server 110 or other servers, as illustrated in FIG. 3 later. Other web requests such as a request to obtain a base page or embedded objects are a target for redirection. If the web request is a target for redirection, the first level redirection L1 is performed. The origin server 110 may perform the first level redirection L1. Alternatively, other servers such as a cooperative server, a DNS server, or a user's system may perform the first level redirection by selecting a manager that handles the request redirected by the first level redirection. The cooperative server is a dedicated server that finds the best manager to reduce the origin server's overhead. For example, if the origin server 110 sends a request including a client IP address and its domain, the cooperative server returns the address of the best manager to the origin server 110. The DNS server may be used for the DNS redirection and responds to a DNS request from the client 160.

To perform the first level redirection L1, the origin server 110 determines a best manager among the managers 140 and 145 associated with the server groups 120 and 130. In other embodiment, servers such as the supervisor server 170, the DNS server, etc. may determine the best manager. As shown in Table 1 above, the first level redirection L1 may be performed based on static information. In this embodiment, static information may be network topology such as the network distance. When the network distance is a determining factor to locate the best manager, the base page is redirected to a particular manager that is close to a user's machine in terms of the network distance. The selected best manager responds to the web request. In particular, the base page is redirected to the best manager.

Referring to FIG. 3, the web requests for the base page and embedded object are described. FIG. 3 illustrates an exemplary website having the domain name, www.oldmov.com that provides video (movies) streaming services. A user sends a request 310 to a website having domain name, www.oldmov.com. A local DNS name server looks up an IP address mapping table to find an IP address corresponding to www.oldmov.com. The corresponding IP address is sent to a web browser of the user and the web browser sends the request to a server having the corresponding IP address, which is an origin server such as the origin server 110 of FIG. 1. The origin server responds with a web page 320 showing two links, Old Movies and New Movies. Corresponding URLs are coded to the links, Old Movies and New Movies. For instance, the link, New Movies has the associated URL, www.oldmov.com/newmovies.asp 322. When a user clicks the link, a next display 330 shows three links, New Movie 1, New Movie 2 and New Movie 3. Clicking the link, New Movie 1 may provide a web document of www.oldmov.com/newmovie1.asx. The web requests from a user to access the domain name, www.oldmov.com and New Movies are not redirected and processed by the origin server 110. However, the web request for New Movie 1 is subject to the redirection. The best manager receives and processes the web request for New Movie 1 as a result of the redirection. The file format, asx stands for Active Streaming XML and may be often used with a media file such as a video file, an audio file, etc. The file, newmovie1.asx 340 contains brief information about a related media file. An embedded object, newmovie1.wmv 350 is included in the newmovie1.asx file. The embedded object has the URL of mms://media.oldmov.com/newmovie1.wmv. When the user clicks the link to newmovie1.asx, a browser parses the embedded object(s) of the newmovie1.asx. Based on file extension of the parsed object, the file mms://media.oldmov.com/newmovie1.wmv is requested through plug-in software such as Microsoft Media player. In this embodiment, the base page, newmovie1.asx is not cached and the video file, newmovie1.wmv is cached at servers other than the origin server 110. In other embodiments, the base page, newmovie1.asx may be cached at cache servers and/or managers. As shown in FIG. 2, the first level redirection L1 occurs as to this base page, newmovie1.asx. Various redirection techniques, such as DNS redirection 210, application redirection 215 and manual redirection 220 may be used to locate the best manager in FIG. 2.

With regard to the web request for the base page 340, newmovie1.asx, the first level redirection 205 (L1) using the DNS redirection 210 of FIG. 2 is performed as follows. To perform the DNS redirection 210, the origin server 110 modifies the URL for "newmovie1.asx" with a representative name of managers.

Original URL: http://www.oldmov.com/newmovie1.asx

Modified URL with Representative Manager Name:

http://choose.hwmanager.com/www.oldmov.com/newmovie1.asx

The name, "choose.hwmanager.com" is the representative name of the manager, which may apply to all of the managers distributed around the network. One of the managers may be selected to handle the redirected request to the base page, newmovie1.asx. As described above, the best manager is a manager close to a user's location in this embodiment. The modified URL is provided to a user, which obtains an IP address of a manager corresponding to the modified URL from a local DNS name server. Although the local DNS/name server is not shown in FIGS. 1 and 2, the local DNS server provides IP addresses mapped to URLs in web applications. If the DNS name server has the requested information, it provides a user with the IP address of the manager. If the DNS name server has no information, it sends a request to an authoritative DNS name server about locating a manager that is close to a user's location. The authoritative name server sends an IP address of the best manager to the local DNS name server. The local DNS server provides the IP address to a user. A user sends the request for newmovie1.asx to the best manager having the corresponding IP address. In other embodiments, the origin domain name may be used as a part of the representative name such as "choosemanager.oldmov.com." A user may desire to use the origin domain name, oldmov.com for some reasons such as a user may use the same cookie value for all of the cache servers if the origin domain name is used.

Alternatively, the first level redirection 205 (L1) may be performed with the application redirection 215 with regard to the web request for the base page 340, newmovie1.asx. Upon receipt of the request for the base page, the origin server 110 may use the HTTP redirection to perform the first level redirection 205 (L1). With the HTTP redirection, the origin server 110 identifies an IP address of a user's request. Depending on the IP address representing a user's location, the origin server 110 may select the best manager and reply to a user's request with a new URL of the manager. In other embodiment, the cooperative server 170 may be provided and the origin server 110 inquires the cooperative server 170 about the new URL of the manager. For instance, the request to http://www.oldmov.com/newmovie1.asx may be redirected with HTTP location header as follows:

Original URL: http://www.oldmov.com/
newmovie1.asx

Response: Location:

http://tokyo.hwmanager.com/www.oldmov.com/
newmovie1.asx

A browser will send a new request to a site having the new URL. In addition to the user's location, other information such as HTTP header or cookies may be used for the first level redirection. For instance, a preferred language may be considered for the redirection as follows:

http://tokyo.hwmanager.com/www.oldmov.com/
newmovie1_13japanese.asx

Figure 4:
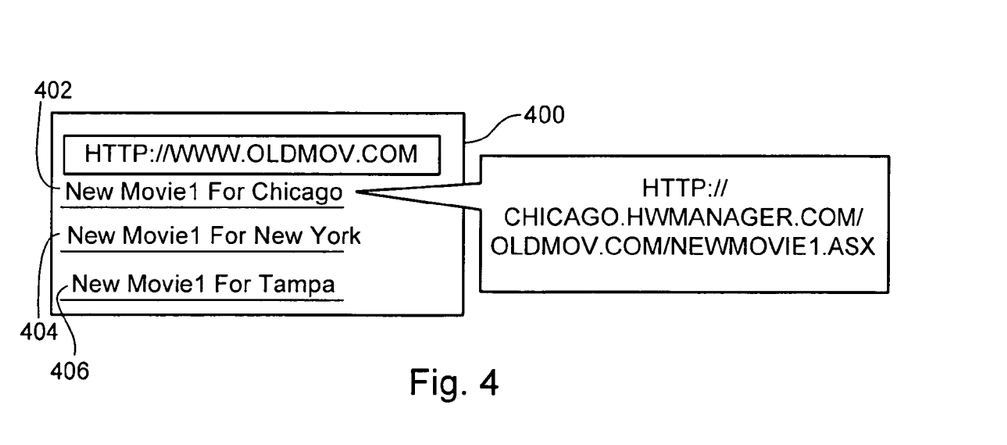
FIG. 4 further illustrates the first level redirection using a manual redirection.

One of ordinary skill in the art may appreciate that various other application redirections such as metatag, URL rewriting, using HTML base tag, etc. are possible. In another embodiment, the redirection of the web request for the base page 340, newmovie1.asx may be performed manually (220). FIG. 4 illustrates a screen 400 displaying manual redirection. A user is presented with three links 402, 404 and 406 based on geographic locations, such as Chicago, New York and Tampa. The user may manually choose a manager that is close to its location by clicking on the link. Each link has the corresponding URL as follows:

New Movie 1 for Chicago 402:

http://chicago.hwmanager.com/www.oldmov.com/
newmovie1.asx

New Movie 1 for New York 404:

http://newyork.hwmanager.com/www.oldmov.com/
newmovie1.asx

New Movie 1 for Tampa 406:

http://tampa.hwmanager.con/www.oldmov.com/
newmovie1.asx

In the URLs 402, 404 and 406, information about the origin server 110, i.e., "www.oldmov.com" is included in the path name. With that information, the selected manager may determine where the redirection is initiated. Alternatively, the origin server information may be preserved in a table contained in the selected manager as a particular manager hostname such as tampa12345.

Newmovie1 for Tampa http://tampa12345.hwmanager.com/newmovie1.asx

The number, 12345 may operate as a key identifying the origin server's domain name, www.oldmov.com. At the table of the selected manager, keys such as 12345 and multiple domain names may be mapped such that the manager is able to identify where the request has been redirected. Further, information on cache servers having embedded object may be stored in the information mapped to this key.

As described above, the request for the base page, newmovie1.asx is redirected to a certain manager based on the DNS redirection, the application redirection, or the manual redirection. As illustrated in FIG. 2, the manager 140 of FIG. 1 is selected and receives the redirected request for the base page, newmovie1.asx. The manager 140 first may determine whether the base page 340, newmovie1.asx (FIG. 3) is cached or not.

In this embodiment, the base page, newmovie1.asx 340 is not cached, and the manager 140 may proxy the request to the origin server 110. After receiving a response from the origin server 110, the manager 140 parses the base page, newmovie1.asx and determines whether the base page contains other content that needs redirection. The manager 140 identifies the objects to be redirected as follows:

Original Embedded Objects: mms://media.oldmov-
.com/newmovie1.wmv

Manager: mms://changethis.media.oldmov.com/
newmovie1.wmv

The change of the URL of the embedded objects to http://changethis.media.oldmov.com/newmovie1.wmv may be made offline at the origin server 110. The embedded object contained in the base page 340, newmovie1.asx may have the changed hostname, e.g., "changethis.media.oldmov.com" or "key123.changethis.media.oldmov.com" upon receipt at the manager 140. In the example, "key123" may indicate location of embedded objects in cache servers. The manager 140 identifies the changed hostname, "changethis.media. oldmov.com" and determines that the embedded object, newmovie1.wmv needs the redirection.

Subsequently, the manager 140 may perform the second level redirection 250 (L2) in FIG. 2. Upon identifying the content requiring the second level redirection 250 (L2), the manager 140 may select a best cache server among the server group 120 and redirect the embedded objects, etc. to the selected cache server. The second level redirection is based on application redirection. The DNS redirection may not be performed with the second level redirection. The DNS redirection may not properly utilize dynamic information. For instance, caches preserved in DNS servers may take some times for updates. The application redirection is performed based on application protocols and/or contents used in requests from a client. For instance, if a client's request uses HTTP, the redirection may use the information in HTTP headers and the redirection is performed with the HTTP redirection, URL rewriting, meta tag, HTML's base tag, etc. If a client's request is a P2P application, the redirection is performed with the protocol of the P2P application. With application redirection, a different QoS may be provided with application information and detailed client information including actual IP addresses may be used. Further, real-time result to the client's request may be directly passed to a client. On the other hand, the first level redirection may or may not be application redirection. For instance, the DNS redirection may be used regardless of the protocols used in the client's request.

As shown in FIG. 2 and Table 1, the second level redirection 250 (L2) is performed for web requests for embedded objects based on the dynamic information. Unlike the first level redirection 205 (L1), the second level redirection 250 (L2) may occur locally, i.e., at the manager level and rely on dynamic information 260. This is because the manager 140 is able to monitor and manage live status information of the group of servers 120.

As described above, dynamic information may include frequently changed information such as CPU usage, memory usage, bandwidth consumption, hard disk drive usage, a number of connections or sessions, etc. Dynamic information further may include local information regarding cache servers. For example, cache servers may differentiate QoS. Dynamic information is fed to the manager 140 from servers of the group 120 periodically and on a real-time basis. The manager 140 may evaluate this information and determine which server 280 is available or the best situated for serving the embedded objects.

The monitoring of the status of the group of server 120 is continuous and ongoing. The manager 140 may be implemented with application software in this embodiment. Alternatively, the manager 140 may be a server or other hardware that is dedicated to monitoring of the server status. By monitoring the servers, the manager 140 knows live status of the servers, e.g. whether the servers are overloaded.

After identifying the best cache server 280 based on the dynamic information, the manager 140 may modify or rewrite the URLs of such content (275) as shown in FIG. 2. The rewritten or modified URL may include a domain name or an IP address of the selected cache server as follows:

mms://tampamediaagent1.hwcache.com/media.oldmov.com/newmovie1.wmv

The selected cache server 280 may be a single server or a server cluster. A new port number also may be used. In other embodiment, other redirection solutions such as HTTP redirection are possible.

Figure 5:
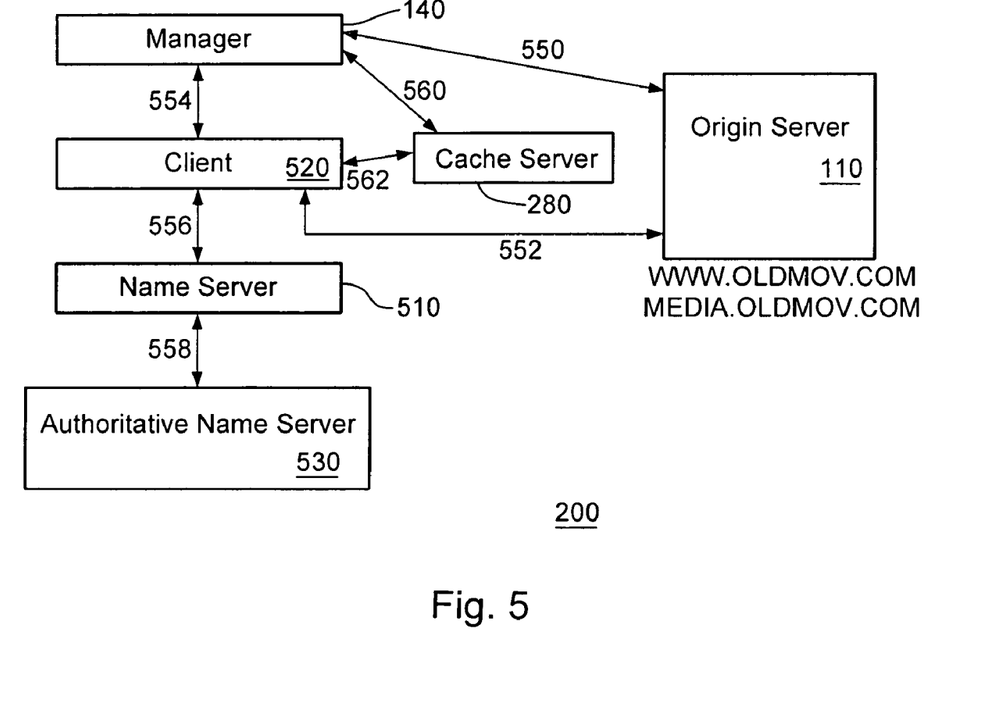
FIG. 5 is a block diagram illustrating data flow of a redirected request.

FIG. 5 is a data flow diagram of the multi-level redirection system 200. The multi-level redirection system 200 further includes a name (DNS) server 510, a client server 520 and an authoritative name (DNS) server 530 for hwmanager.com. As noted above, the origin server 110 hosts the website having the domain name such as www.oldmov.com, and a media server site, media.oldmov.com. The client 520 sends a web request to the origin server 110 (flow 552). The client 520's web request for the base page is a target for redirection. In FIG. 5, DNS redirection is used by way of example but it may be appreciated by one of ordinary skill in the art that other redirection methods are possible. At the origin server 110, the domain name of the base page, newmovie1.asx is modified with a representative manager domain name, for example:

http://choose.hwmanager.com/www.oldmov.com/newmovie1.asx.

The origin server 110 provides the representative manager name to the client 520, which requests an IP address of the representative manager name from the name server 510 (flow 556). The name server 510 provides that information if available; otherwise, it inquires the authoritative name server 530 (flow 558) about locating the manager 140 that is close to the location of the client 520. The authoritative name server 530 provides the IP address of the manager to the name server 510 (flow 558). The manager 140 is determined at least based on the static network topology and internet traffic status.

The name server 510 may return the IP address of the manager 140 to the client 520 (flow 556). The client 520 sends a request for the base page, newmovie.asx to the manager 140 having the returned IP address (flow 554). The manager 140 may proxy the request to the origin server 110 (flow 550) because the base page is not cached. If the base page, newmovie.asx is cached at the manager 140, the flow 550 is omitted. The manager 140 parses the base page and locates the embedded object contained in the base page. To redirect the request for the embedded object, the manager 140 selects the best cache server 280 and rewrites the hostname with the chosen cache server 280, such as:

mms://tampamediaagent1.hwcache.com/media.oldmov.com/newmovie1.wmv

The manager 140 bases its selection of the best cache server 280 at least on live status of multiple servers and local traffic. The cache server 280 regularly reports such information to the manager 270 (flow 560). Alternatively, or additionally, the manager 140 monitors the cache servers 280 (flow 560).

The manager 140 provides the modified URL with the hostname to the client 520 (flow 554). The client 520 requests the IP address of the modified hostname to the name server 510 (flow 556). The name server 510 provides the IP address to the client 520 (flow 556). The client 520 sends the request for the embedded object to the chosen cache server 280 (flow 562). Alternatively, the manager 140 may directly pass the IP address to the client 520.

Figure 6:
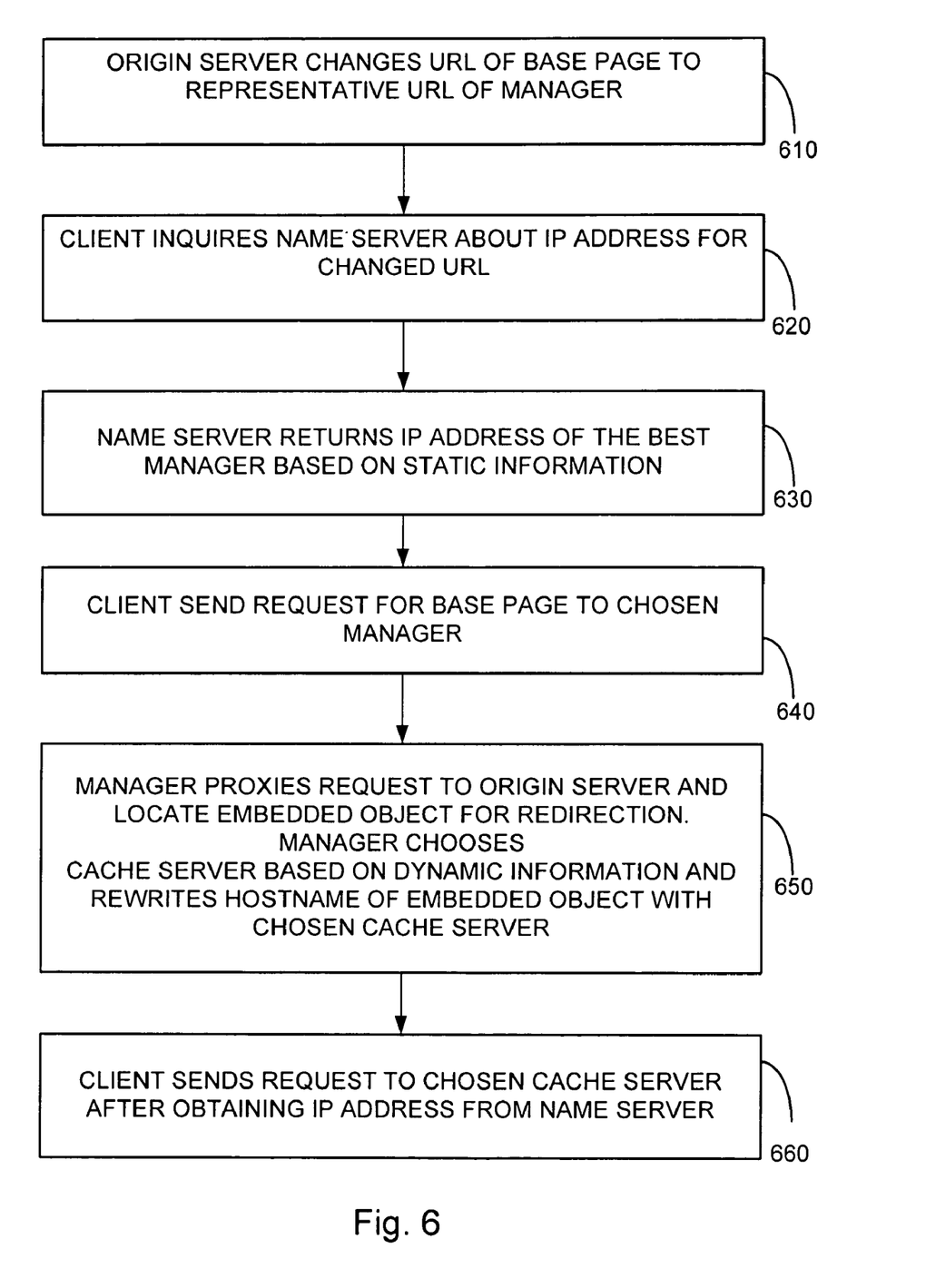
FIG. 6 is a flowchart illustrating redirection of the redirected request.

FIG. 6 is a flowchart illustrating the multi-level redirection of FIG. 5. As described above, the client 520's web request for the base page is to be redirected. For the redirection, the URL of the base page may be configured to be changed to the representative URL of a manager (act 610). The client 520 requests an IP address of the representative URL of the manager (act 620) from the local name server 510. The local name server 510 or the authoritative name server 530 locates the manager 140 based on a user's location, etc. The name server 510 provides the IP address corresponding to the chosen manager 140 to the client 520 (act 630). The client 520 sends the request for the base page to the chosen manager 140 (act 640).

The manager 140 may need to proxy the request to the origin server 110 because the base page is not cached at the manager 140 (act 650). The manager 140 parses the base page and locates embedded objects for the redirection (act 650). The manager determines the best cache server 280 which will provide the embedded objects (act 650). The manager 140 rewrites hostnames of the embedded objects with that of the chosen cache server 280 (act 650). The client 520 receives the rewritten hostname of the embedded objects and inquires the name server 510 about the hostname (act 660). The client 520 sends the request to the chosen cache server 280 (act 660). The cache server 280 provides the embedded object to the client 520.

The multi-level redirection system described above may provide advantages that the dynamic information is considered for redirection without imposing excessive burden on a single point such as the origin server 110. The dynamic information reflects the status of the cache servers on a real-time basis. As a result, the content may be delivered from the best situated cache server to a user. The redirection may not be limited to a particular redirection solution and may be compatible with various redirection solutions.

Second Embodiment

Peer-to-Peer Web Caches Applications

Figure 7:
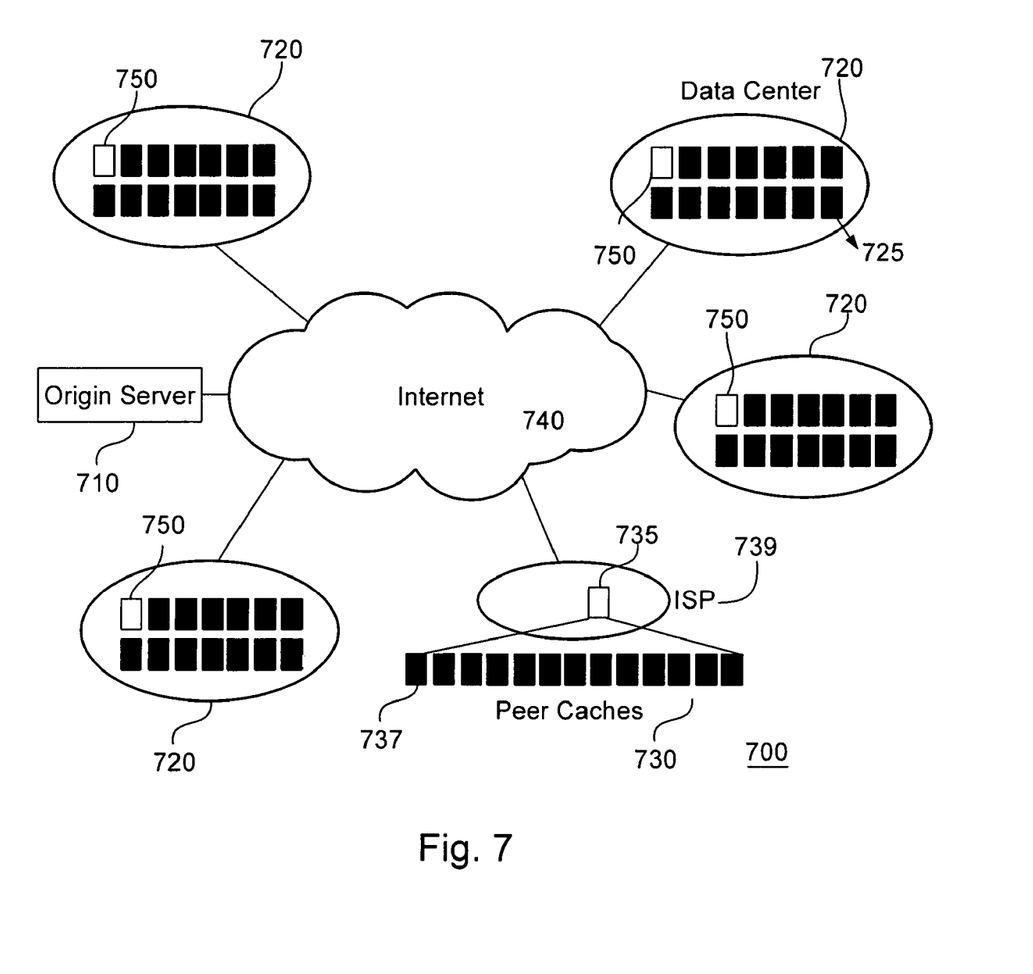
FIG. 7 is a block diagram illustrating another embodiment of a multi-level redirection system having peer-to-peer cache system.

FIG. 7 illustrates another embodiment of a multi-level redirection system 700 for content delivery network. The system 700 includes a peer-to-peer (P2P) cache server group 730 connected through an internet 740. Like the system 100 of FIG. 1, the multi-level redirection system 700 includes an origin server 710 and a plurality of data centers 720. The origin server 710 processes web requests and may be a web server. The plurality of data centers 720 may be geographically distributed throughout the network. Alternatively, or additionally, hosting service providers may select location of the plurality of data centers 720 based on business need such as a number of customers. Each data center may include a plurality of cache or agent servers 725 that process requests. A plurality of managers 750 is assigned to the data centers in this embodiment. In other embodiment, the manager 750 may be shared by two or more data centers. Alternatively, the manager 750 may manage cache servers located in different data centers.

The peer-to-peer (P2P) cache server group 730 is not operated by hosting service providers. Rather, the P2P cache server group 730 may be operated by individual users who are often referred to as volunteers. Volunteers may be registered with an internet service provider (ISP) 739 to use their computers as cache servers. When information or data is stored in volunteers' computers 737, other users treat volunteers' computers 737 as cache servers and download such information or data. The operation of the P2P cache server group 730 may be arbitrary and unpredictable. Volunteers may freely turn off their computers 737 and delete information/data stored therein. The P2P cache server group 730 has a manager 735 which is dedicated to monitoring and controlling of volunteers' computers 737 serving as the P2P cache/agent servers.

In the P2P cache server group 730, the manager 735 may monitor and check the status of the cache servers 737. When a user's request is initiated adjacent to the manager 735, the request is redirected to the manager 735. In the multi-level redirection system 700, the request for a particular object is subject to redirection. The manager 735 may select one of the P2P cache servers 737 based on live status of the cache servers 737. Especially in the P2P cache, a particular cache server 737 may be freely turned off by a voluntary user. Checking the live status of the P2P cache may generate more useful information. The chosen cache server 737 may provide the content that a user has requested. In the multi-level redirection system 700, the P2P cache may be effectively incorporated into the multi-level redirection system 700 because the P2P cache is regulated with the manager 735.

Third Embodiment

Pure Peer-to-Peer Applications

Figure 8:
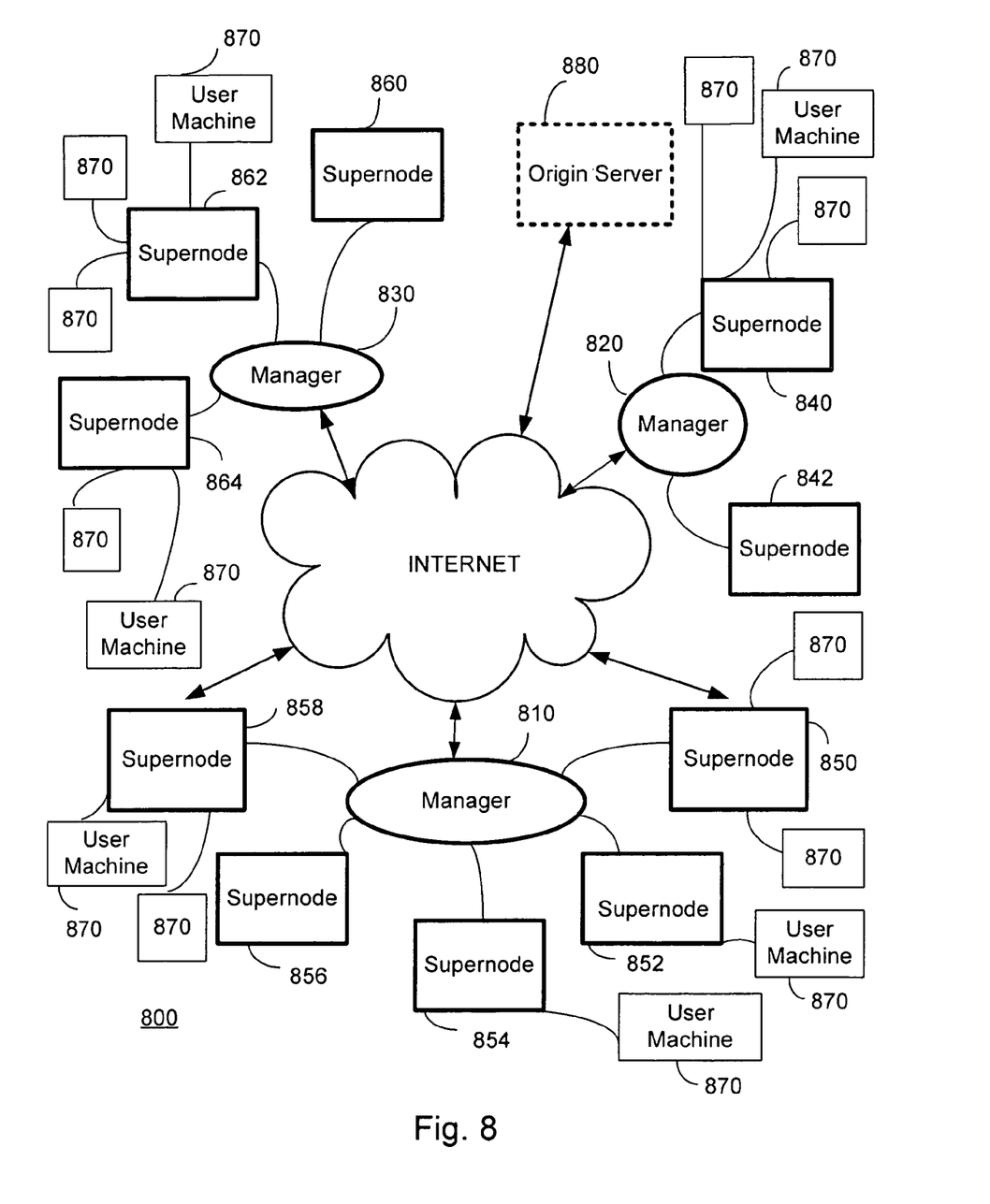
FIG. 8 is a block diagram illustrating another embodiment of a multi-level redirection system having pure peer-to-peer communication network.

In FIG. 7, the P2P web based applications are described. As noted above, the P2P web based applications may be incorporated into the multi-level redirection system for web applications. FIG. 8 is a block diagram illustrating pure Peer-to-Peer ("P2P") applications. Pure P2P applications include a number of individual users' machines 870 that may be arbitrarily distributed in the network. These machines 870 are connected to the internet. The number of the individual users' machines 870 is arbitrary and may be unlimited in the network. The network also includes a number of managers 810, 820, 830. In the pure P2P application, the individual users may select supernodes to obtain desired data. Supernodes operate as contact points of the individual users. Supernodes provide contents to the individual users and/or inform the individual users of location of objects at the user machines 870.

Managers 810, 820 and 830 may be controlled and operated by commercial entities such that the managers 810, 820 and 830 are able to provide stable services. Super nodes, or individual users' machines or individual nodes may or may not be controlled by commercial entities.

Managers 810, 820 and 830 are assigned with a number of supernodes. As shown in FIG. 8, the manager 810 is assigned to supernodes 850-858. Likewise, the manager 820 is assigned with supernodes 840 and 842 and the manager 830 is assigned with supernodes 860-864. A number of supernodes, managers and individual users' machine may not be limited in the pure P2P system 800. The pure P2P applications may not be limited to web based applications and various protocols may be used.

In the pure P2P system 800, one of the user machines 870 may ask a location of an object. This request for a particular object, location of an object, or a peer is a target for redirection. This request may not be a web based one. For instance, the request is redirected to the manager 820 because the manager 820 is close to the requesting machine 870. Locating the manager 820 may not require a separate server. The machine 870 may locate the manager 820 from the local DNS name server and/or the authoritative DNS name server. This process of locating the manager 820 may correspond to the first level redirection. Subsequently, the manager 820 may locate a best supernode among supernodes 840 and 842. The manager 820 monitors the supernodes 840 and/or 842 and determines their live status. This dynamic information as a result of monitoring is considered in locating the best supernode 840 or 842. This process of selecting the best supernode may correspond to the second level redirection.

In this embodiment, an origin server 880 may be used as a login server such that the pure P2P application may generate revenue. For instance, with the login process, billing to users is possible. Accordingly, the multi-level redirection method may be applicable to the pure P2P application.

Fourth Embodiment

Multi-level Redirection Involving Different Types of Content

In FIGS. 1-6, the multi-level redirection is associated with a particular type of content, i.e., the base page and the embedded object. As long as the first level redirection is associated with the static information and the second level redirection is associated with the dynamic information, type of requests and the redirected content may not be limited to a web content including the base page/embedded object.

Figure 9:
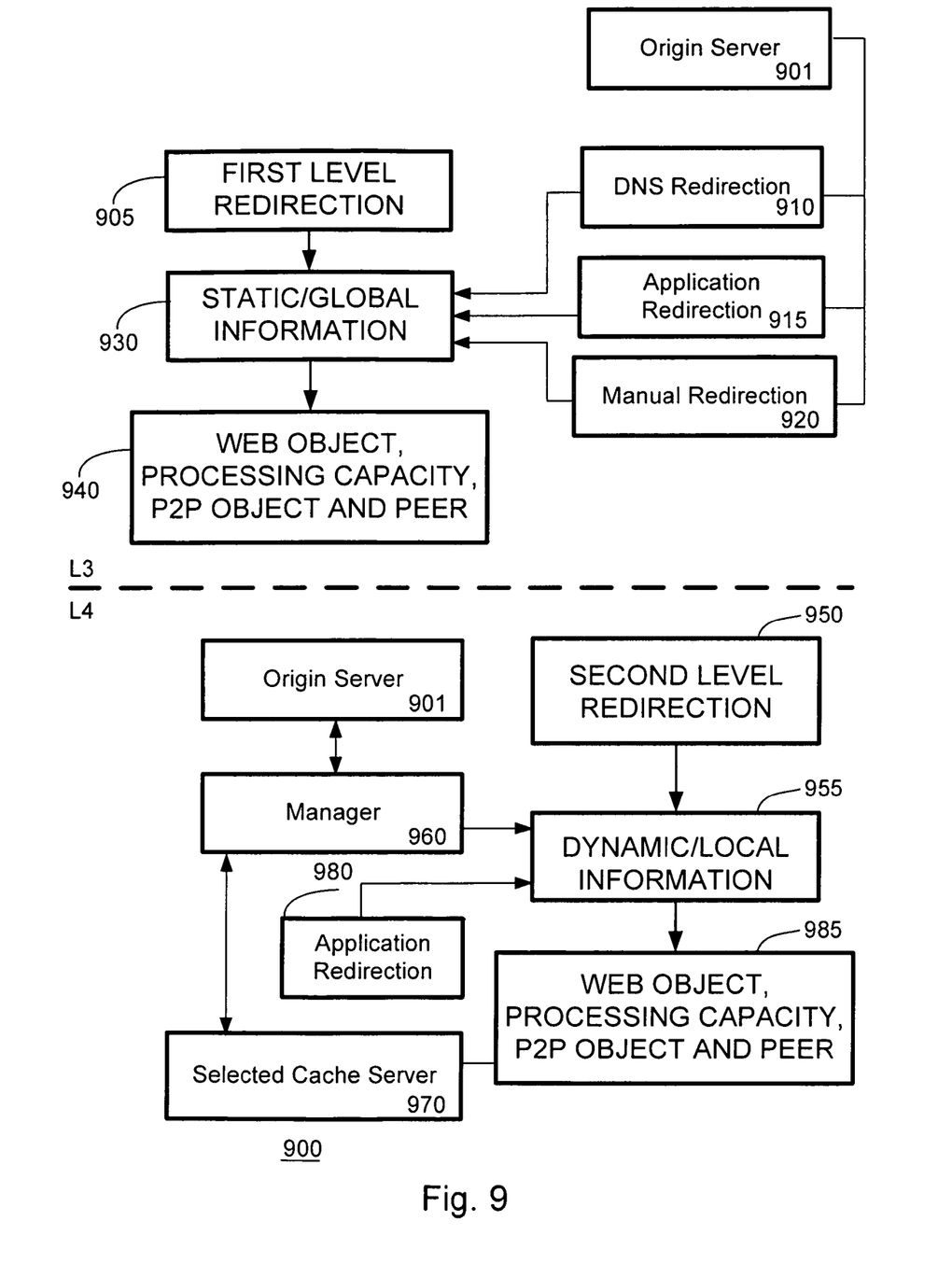
FIG. 9 is a flow chart illustrating redirection of various types of contents.

FIG. 9 illustrates different embodiments of multi-level redirection involving various types of content. The multi-level redirection system 900 includes an origin server 901 and a manager 960. Redirection solutions including DNS redirection 910, application redirection 915 and manual redirection 920 may be used, as described above in conjunction with FIG. 2. The multi-level redirection system 900 performs, for instance, two-level redirections L3 and L4. First level redirection 905 is performed based on static/global information 930. In one embodiment, a single web object 940 is redirected at the first level redirection 905 (L3). For instance, the single object is embedded objects or links. This multi-level redirection system 900 operates as follows. A user has received a base page in response to a request without redirection. As noted above, the base page may show a link to a user. When a user clicks the link, an object contained in the base page may be requested. This request is a target for the first and second level redirections 905 (L3) and 950 (L4).

Web Object URL: http://choosemanager.oldmov.com/myobject.wmv By way of example only, a user is located in Seoul, Korea. For the first level redirection 905 (L3), DNS redirection solution 910 is used in this embodiment. One of ordinary skill would appreciate that application redirection 915, or manual redirection 920 is possible. A local DNS server provides an IP address of a manager 960 that manages a plurality of cache servers operating in Seoul, Korea and a user's web browser sends a request for the object to the selected manager 960.

At second level redirection 950 (L4), the manager 960 then selects the best cache server 970 among the plurality of cache servers that it is managing. The selection is performed based on local/dynamic information 955. The manager 960 operates to redirect the request for the object to the selected cache server 970. The redirection is application redirection and may be performed with HTTP redirection, proxying, or other application redirection methods.

In another embodiment, a user's request may not be a request for a web document, or a web object. A user may request borrowing processing capacity from other cache servers 940. This request for borrowing processing capacity is a target for redirection. Application Service Provider ("ASP"), or software requiring massive processing power such as genetic code processing program may require borrowing processing capacity. A single entity, and/or general users may provide the processing capacity. Additionally, a different request by a user may be subject to redirection along with the request for borrowing processing capacity. For example, a user's request for a content containing details of borrowing processing capacity is the target for the first level redirection 905 (L3) and a user's request for borrowing processing capacity is the target for the second level redirection 950 (L4).

The multi-level redirection for borrowing the processing capacity may operate as follows. A user application requests a certain level of processing capacity. A user may specify processing environment, e.g., a server should be equipped with a certain specification in terms of processors, memory, etc., or a server should understand a proprietary protocol, etc. This request may be made as a web request, or any other proprietary protocols of software. This request is redirected to the particular manager 960 based on the global/static information 930 such as a user's location. The redirection solutions may include the DNS redirection 910, or other redirections 915 and 920. The user application may be required to understand the redirection solutions. The selected manager 960 manages a plurality of cache servers. The manager 960 chooses the best cache server or a group of cache servers 970 based on local/dynamic/application information such as availability, server load, licenses, software availability, QoS, information in the request, etc. The manager 960 may redirect the request to the selected cache server or the selected group of cache servers 970. The user application may communicate with the selected server(s) 970 and obtain the result after computation by the server(s) 970.

In further another embodiment, the multi-level redirection system operates to locate peer P2P servers, or an object, as described above in conjunction with FIG. 8. The peer P2P servers may be a communication partner to a user, including a supernode.

Fifth Embodiment

Multi-level Redirection Involving More than Three Level Redirections

The multi-level redirection described above involves two-level redirection including the first level and the second level redirection for various types of content. The two-level redirection may be practical applications and be easily compatible with preexisting CDN environment. Multi-level redirection may not be limited to the two-level redirection and may include three or more level redirections.

Figure 10:
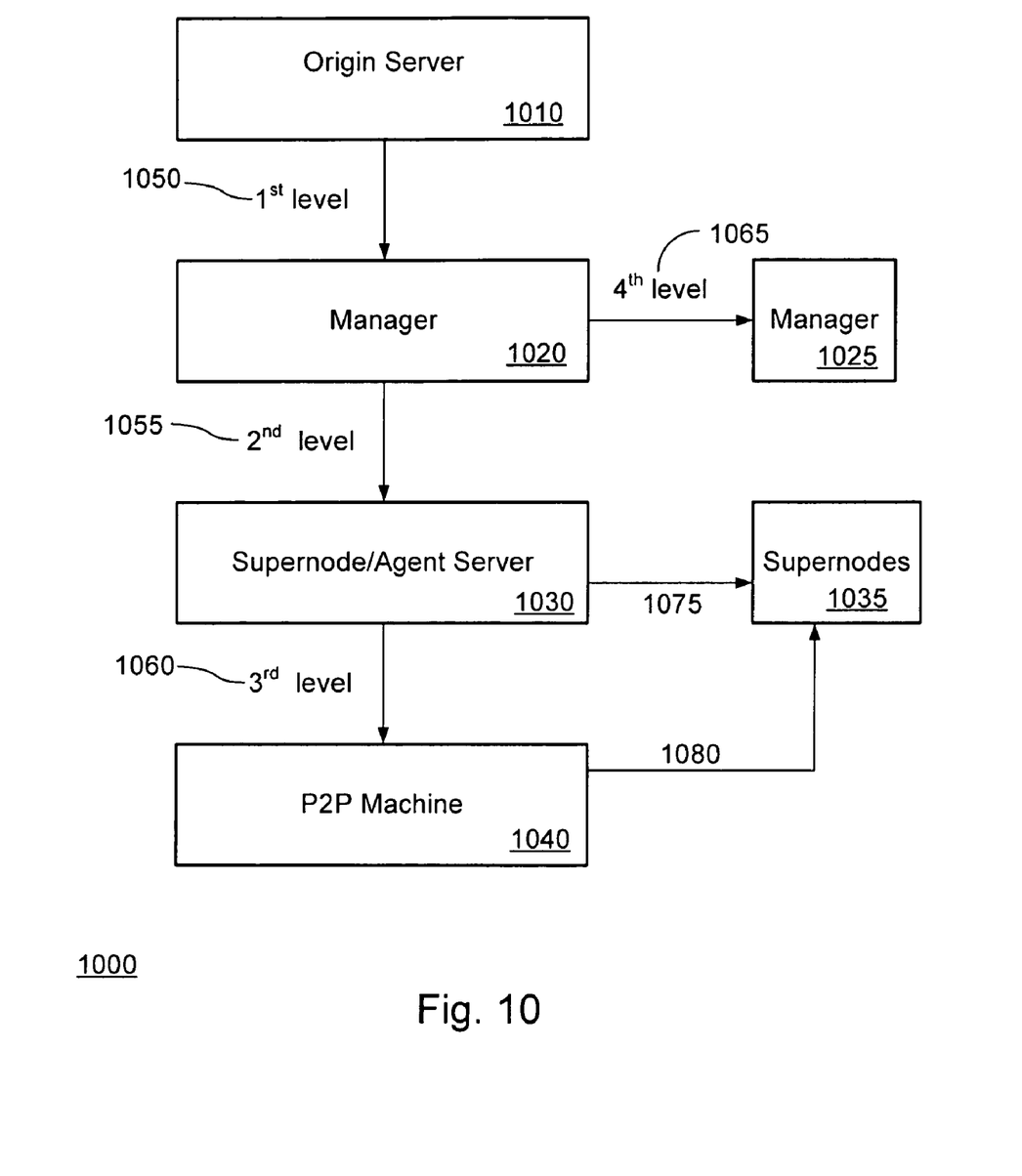
FIG. 10 illustrates three-level redirection in pure peer-to-peer communication network.

FIG. 10 is a block diagram illustrating three-level redirection in pure P2P application as illustrated in FIG. 8. In a pure P2P network 1000, an origin server 1010, a manager 1020, a supernode/agent server 1030 and a P2P machine 1040 are included. The origin server 1010 may centralize operation of the P2P network 1000 and operate as a billing server. Alternatively, or additionally, a user may login through the origin server 1010 to utilize services provided by the P2P network 1000. Any request by a certain P2P machine for an object or a peer, for instance, may be redirected to the manager 1020 based on static and global information, which corresponds to a first level redirection 1050. The manager 1020 may be controlled by commercial entities. The manager 1020 selects a best supernode/agent server 1030 assigned at that node based on dynamic, local, and application information, which corresponds to a second level redirection 1055. As a result of the second level redirection, multiple candidates for supernodes such as 1030 and 1035 are found. The supernode/agent server 1030 may directly provide the requested content to a user. When the supernode/agent server 1030 may be overloaded, or may not have the requested content, the supernode/agent server 1030 redirects the request to the P2P machine 1040. The supernode/agent server 1030 may redirect the request to the P2P machine 1040, which corresponds to a third level redirection 1060. The third level redirection 1060 uses dynamic, local and application information like the second level redirection 1055. The supernode server 1030 may operate as a contact point of P2P machines such as the P2P machine 1040. As a result, three-level redirection is performed. Alternatively, if the manager 1020 may not find a requested object from the supernode/agent server 1030, it redirects the request to other managers 1025, which corresponds to a fourth level redirection 1065. The request is being propagated until the requested content is found.

In FIG. 10, the manager 1020 and the supernode 1030 may preserve a centralized table that may locate the requested object. As described above, the manager 1020 may redirect the request for the object to other nodes (1065) until the requested object may be found. In other embodiment, a request may be redirected from the supernode/agent server 1030 and/or the P2P machine 1040 to other supernodes 1035 (1075, 1080) upon absence of the requested data. Such process may involve more than three-level redirections. Finding the requested content may not be limited to the P2P applications. It is applicable to web based applications. The managers may be in communication with one another, or a supervisor server may engage in locating the requested object. In particular, when the requested object may not be easily available, redirection to locate this requested object may involve four or more levels of redirection.

In the embodiments described above, the multi-level redirection system performs redirection based on the static information at the first level and redirection based on the dynamic information at the second level. The first level redirection may be DNS, application, or manual redirection. The second level redirection is application redirection. In many occasions, the first level may be global scale redirection and the second level may be local scale redirection. The origin server, the DNS server, or the cooperative server may not monitor a greater number of cache servers distributed throughout the network. The manager is assigned to monitor the plurality of cache servers. The manager serves to locate the best cache server that responds to the user's web request. The manager also serves to control and manage overload of the cache servers contained in the particular data center. The manager monitors the cache servers and fully utilizes dynamic status of each server to redirect embedded objects therefrom.

The multi-level redirection method not only redirects the embedded objects but also the base page. The redirection of the base page may not be limited to a certain redirection method and employ various redirection techniques, such as DNS redirection, and/or the application redirection.

The multi-level redirection method may be used with P2P caching system. Although the P2P caching system may be arbitrary, unlimited, and uncontrollable, the P2P caching system is integrated with the multi-level redirection. With the multi-level redirection system, the P2P caching system may be controllable and incorporated into other commercial content delivery networks.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A multi-level redirection system, comprising:
   a plurality of managers receiving a redirected request via a first level redirection of an original request based on global information and performing a second level redirection of the redirected request to one of a group of cache servers based on local information; and,
   wherein the global information relates to multiple distributed network locations and the local information is specific to one of the multiple distributed network locations;
   a domain name server for storing IP addresses of the plurality of managers and returning the IP addresses of the plurality of managers in response to the original request from a client;
   wherein the first level redirection operates to redirect the original request to one of the plurality of managers based on the returned IP addresses of the plurality of managers, or alternatively, based on a reply to the original request by the origin server;
   wherein the plurality of managers is geographically distributed across a network based on the global information, and at each of the multiple distributed network locations, each manager is associated with and assigned to the group of cache servers for monitoring and selecting the cache servers;
   wherein the group of the cache servers includes multiple, cache servers, instead of an individual cache server, at least one cache server comprising a central processing unit (CPU) and a memory, and each manager monitors a live status of the group of the cache servers,
   wherein each manager selects a best cache server within the group of the cache servers based on the live status of the multiple cache servers.

2. The multi-level redirection system of claim 1, wherein the global information comprises integrated information from the multiple distributed network locations based on network topology.

3. The multi-level redirection system of claim 2, wherein the global information includes legal restriction on content service.

4. The multi-level redirection system of claim 1, wherein the original request and the redirected request are configured to request an identical object.

5. The multi-level redirection system of claim 4, wherein the original request and the redirected request comprise a request for an embedded object.

6. The multi-level redirection system of claim 1, wherein the first level redirection comprises redirection of a base page and the second level redirection comprises redirection of an embedded object.

7. The multi-level redirection system of claim 1, wherein the original request and the redirected request comprise a request for location of an object in a peer of a peer-to-peer (P2P) network.

8. The multi-level redirection system of claim 1, wherein at least one of the original request or the redirected request comprise a request for borrowing processing capacity of the cache servers.

9. The multi-level redirection system of claim 1, wherein the first level redirection operates to redirect the original request to one of the plurality of managers based on the returned IP address of one of the plurality of manager from the domain name server.

10. The multi-level redirection system of claim 1, wherein the cache servers comprise a plurality of supernode servers that operates as a contact point in a P2P network.

11. The multi-level redirection system of claim 9, wherein the second level redirection is an application redirection performed based on application protocols and contents used in the original and redirected requests.

12. A multi-level redirection method, comprising:
   performing a first level redirection of an original request to one of a plurality of managers based on global information, wherein performing the first level redirection comprises:
      redirecting the original request to one of the plurality of managers based on an IP address of one of the plurality of managers; or, alternatively,
      redirecting the original request to one of the plurality of managers based on a reply to the original request by the origin server;
   at one of the plurality of managers, receiving a redirected request of the original request via the first level redirection, wherein the plurality of managers is geographically distributed across a network based on the global information, and at each of the multiple distributed network locations, each manager is associated with and assigned to a group of cache servers for monitoring and selecting the cache servers, wherein the group of cache servers includes multiple cache servers, instead of an individual cache server, at least one cache server comprising a central processing unit (CPU) and a memory, and each manager monitors a live status of the group of cache servers; and performing a second level redirection of the redirected request to one of the group of cache servers based on local information, wherein each manager selects a best cache server within the group of the cache servers based on the live status of the multiple cache servers;
wherein the global information relates to multiple distributed network locations and the local information is specific to one of the multiple distributed network locations.

13. The multi-level redirection method of claim 12, wherein performing the first level redirection comprises redirecting to one of the plurality of managers a base page in response to the original request.

14. The multi-level redirection method of claim 13, wherein performing the first level redirection comprises redirecting the original request addressed to the origin server to one of the plurality of managers based on the IP address of one of the plurality of managers.

15. The multi-level redirection method of claim 14, further comprising at one of the plurality of managers, sending a proxy request to the origin server upon determination that the base page is not cached at that manager.

16. The multi-level redirection method of claim 13, wherein performing the second level redirection comprises redirecting to one of the group of the cache servers the redirected request for at least one embedded objects.

17. The multi-level redirection method of claim 12, further comprising at one of the plurality of managers, monitoring and evaluating the local information relevant to the group of cache servers on a real-time basis.

18. The multi-level redirection method of claim 12, wherein performing the first level redirection comprises providing an IP address of one of the plurality of managers to a client which has sent the original request.

19. The multi-level redirection method of claim 18, further comprising locating one of the plurality of managers proximate a location of the client based on the IP address of that manager provided to the client.

20. The multi-level redirection method of claim 14, wherein the second level redirection is application redirection performed based on application protocols and contents used in the original and redirected requests.

21. The multi-level redirection method of claim 16, wherein performing the second level redirection comprises modifying a uniform resource locator (URL) of the embedded object to include a name of one of the group of the cache servers.

22. The multi-level redirection method of claim 12, wherein the original request and the redirected request comprise a request for location of an object in a peer of a peer-to-peer (P2P) network.

* * * * *